United States Patent [19]

Shutler

[11] Patent Number: 5,083,277
[45] Date of Patent: Jan. 21, 1992

[54] FUEL CONTROL SYSTEM
[75] Inventor: Arthur G. Shutler, Bristol, England
[73] Assignee: Rolls-Royce plc, England
[21] Appl. No.: 294,755
[22] Filed: Jan. 9, 1989
[30] Foreign Application Priority Data
Jan. 15, 1988 [GB] United Kingdom ............... 8800904
[51] Int. Cl.$^5$ ........................ F02C 9/28; G05D 7/06
[52] U.S. Cl. .......................... 364/431.02; 60/39.281
[58] Field of Search ............... 364/431.02, 494; 60/39.281, 39.03

[56] References Cited

U.S. PATENT DOCUMENTS

| | | |
|---|---|---|
| 2,888,067 | 5/1959 | Kuzmitz . |
| 4,344,141 | 8/1982 | Yates . |
| 4,507,915 | 4/1985 | Evans ............................... 60/39.281 |
| 4,545,198 | 10/1985 | Yoshida ............................ 60/39.281 |
| 4,612,616 | 9/1986 | Binns et al. ..................... 364/431.02 |
| 4,648,242 | 3/1987 | Griesinger ........................ 60/39.281 |
| 4,672,806 | 6/1987 | Pisano . |
| 4,783,957 | 11/1988 | Harris ............................. 364/431.02 |
| 4,821,193 | 4/1989 | Barber et al. ................... 60/39.281 |
| 4,831,535 | 5/1989 | Blotenberg ...................... 364/431.02 |
| 4,837,697 | 6/1989 | Eisa et al. ....................... 364/431.02 |
| 4,845,943 | 7/1989 | LaPrad et al. .................... 60/39.03 |
| 4,875,168 | 10/1989 | Martin ............................. 60/39.281 |

OTHER PUBLICATIONS

"Experience of One UK Electronic Equipment Supplier with Bite on Engine/Flight Control Systems Over the Past Ten Years—Part 1", *Aircraft Engineering*, 8/86, by Raymond de Gaye, pp. 2-7.

*Primary Examiner*—Felix D. Gruber
*Attorney, Agent, or Firm*—Oliff & Berridge

[57] ABSTRACT

A gas turbine engine fuel control system comprises a microprocessor based control unit programmed to calculate the total fuel requirement to achieve a demanded engine speed on the basis of a steady state fuel requirement plus an additional overfuelling requirement. The overfuelling element is calculated in accordance with the lowest of a number of limiting variables which ensure continued engine integrity and safety and a minimum level to prevent engine flame-out and in which all variables and datums are related to an equivalent engine speed or rate of change of engine speed. The steady state fuel element is likewise calculated using a theoretical engine model based on engine acceleration characteristics. The overall system confers highly accurate control of engine speed and acceleration and enables the use of a simple fuel metering valve, in which fuel flow is directly proportional to valve position.

10 Claims, 6 Drawing Sheets

FUEL CONTROL SYSTEM

FIELD OF THE INVENTION

The invention relates to an engine fuel control system, particularly for a gas turbine engine.

BACKGROUND OF THE INVENTION

A basic purpose of the engine fuel control system is to provide the engine with fuel in a form suitable for combustion and to control the rate of fuel flow for accurate control of engine speed and acceleration. It is known to control engine acceleration by using hydromechanical fuel metering valves which are operated in accordance with fuel control laws and limits based on sensitivity to engine compressor inlet and delivery pressures (P1 and P3) and compressor speed (NH). Pressure related control exhibits good surge recovery characteristics since fuel flow is automatically reduced as P3 drops at the onset of surge. Unfortunately, hydromechanical systems based on this type of fuel control are sensitive to ambient conditions and fuel properties which result in inconsistent engine acceleration performance and maintenance cost penalties due to the need to readjust the fuel system frequently.

It has been proposed to avoid these problems by instituting electronic closed-loop control of actual engine acceleration (dN/dt or NHdot) in accordance with an engine speed schedule designed to avoid surge conditions. Providing the acceleration control is accurate then consistent acceleration performance is achieved under all normal operating conditions. Currently, the earlier hydromechanical fuel control units are retained in case an engine surge should occur and to provide, in the event of failure of the NHdot engine acceleration control loop, emergency acceleration control.

Fuel control systems of this type have an integrating action and in conjunction with their non-linear engine parameter based characteristics offer distinct advantages in the achievement of accurate NHdot control.

SUMMARY OF THE INVENTION

An object of the present invention is to achieve accurate closed-loop control of engine speed and acceleration using an electronic control system, analogue or, preferably, digital in conjunction with a simple electromechanical fuel flow control valve. The valve is connected in a valve position control loop such that fuel flow is related solely to valve position.

In an arrangement of this kind the desirable characteristics of the prior art arising as a result of fuel control valve sensitivity to engine parameters have to be provided, for example, in the digital control system software. The overfuelling and underfuelling limits which form an integral part of a hydromechanical valve mechanism also must be provided within the control system software using transducer measurements of the same engine parameters or of alternative parameters which display adequate surge protection behaviour.

The change to a simple fuel control valve and closed-loop acceleration control offers advantages in reductions in size, weight and maintenance costs, in improved mechanical reliability and in avoiding the necessity for frequent adjustment of the flow control valve. A further object of the present invention is to provide a control system of this type.

According to the present invention there is provided an engine fuel control system in which fuel flow to the engine is controlled by a fuel flow metering valve in response to an aggregate fuel demand signal comprising an element computed in accordance with instantaneous engine speed and an overfuelling element computed in accordance with a pilot's thrust demand.

Preferably the overfuelling element of the signal is computed with regard to engine acceleration limits and engine acceleration is measured with reference to the rate of change of high pressure spool speed.

BRIEF DESCRIPTION OF THE DRAWINGS

A better understanding of the present invention and how it may be carried out in practice will become apparent from the following description of the accompanying drawings, in which.

DESCRIPTION OF THE PREFERRED EMBODIMENTS

Figure 2:
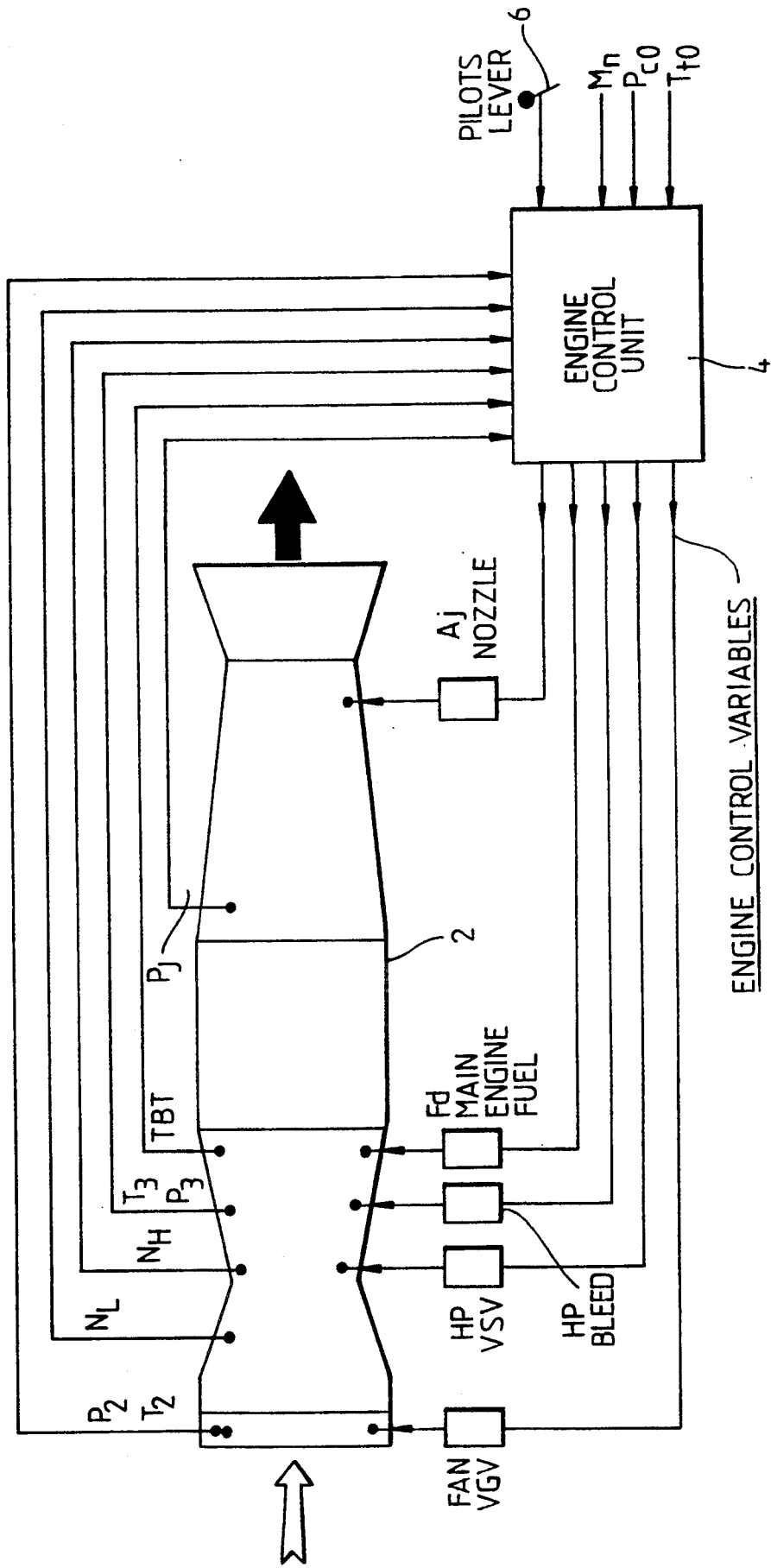
FIG. 2 shows a schematic diagram of a gas turbine engine control system.

The schematic diagram of FIG. 2 illustrates a by-pass turbo-fan jet engine 2 having variable aerodynamic geometry and which is controlled by a plurality of output signals provided by an engine control unit 4. The control action exercised by unit 4 is determined by inputs from transducers mounted at various points on the engine, shown entering at the top of unit 4, and from the pilot's demand unit 6 and several other discrete inputs shown entering at the right of unit 4.

Overall unit 4 controls the start procedure, dry engine running and the reheat. The present invention is concerned almost exclusively with the start procedure and dry engine running.

The pilot's demand unit 6 contains the engine or pilot's thrust lever which is movable to an angle setting within a defined range to determine the engine speed or thrust demand. Usually, the engine speed is measured by the high pressure spool speed NH on multi-spool engines but, as here, in the case of a two-spool engine it is also possible to use the low-pressure spool speed NL to indicate engine speed where it provides a better thrust to pilot's lever angle relationship. The engine speed NL is linearly related to the pilot's lever angle PLA. Thrust is obtained by measuring the engine pressure ratio.

Acceleration and deceleration between one engine speed and another demanded engine speed are controlled to the rate of change of high pressure spool speed NHdot. Speed change rates of approximately 7% per second are applied although, of course, this will differ between engine types.

Dry engine thrust is also subject to further limits determined by maximum turbine blade temperature TBT and maximum low pressure spool speed NL. Other limiting factors may also be applied.

Figure 1:
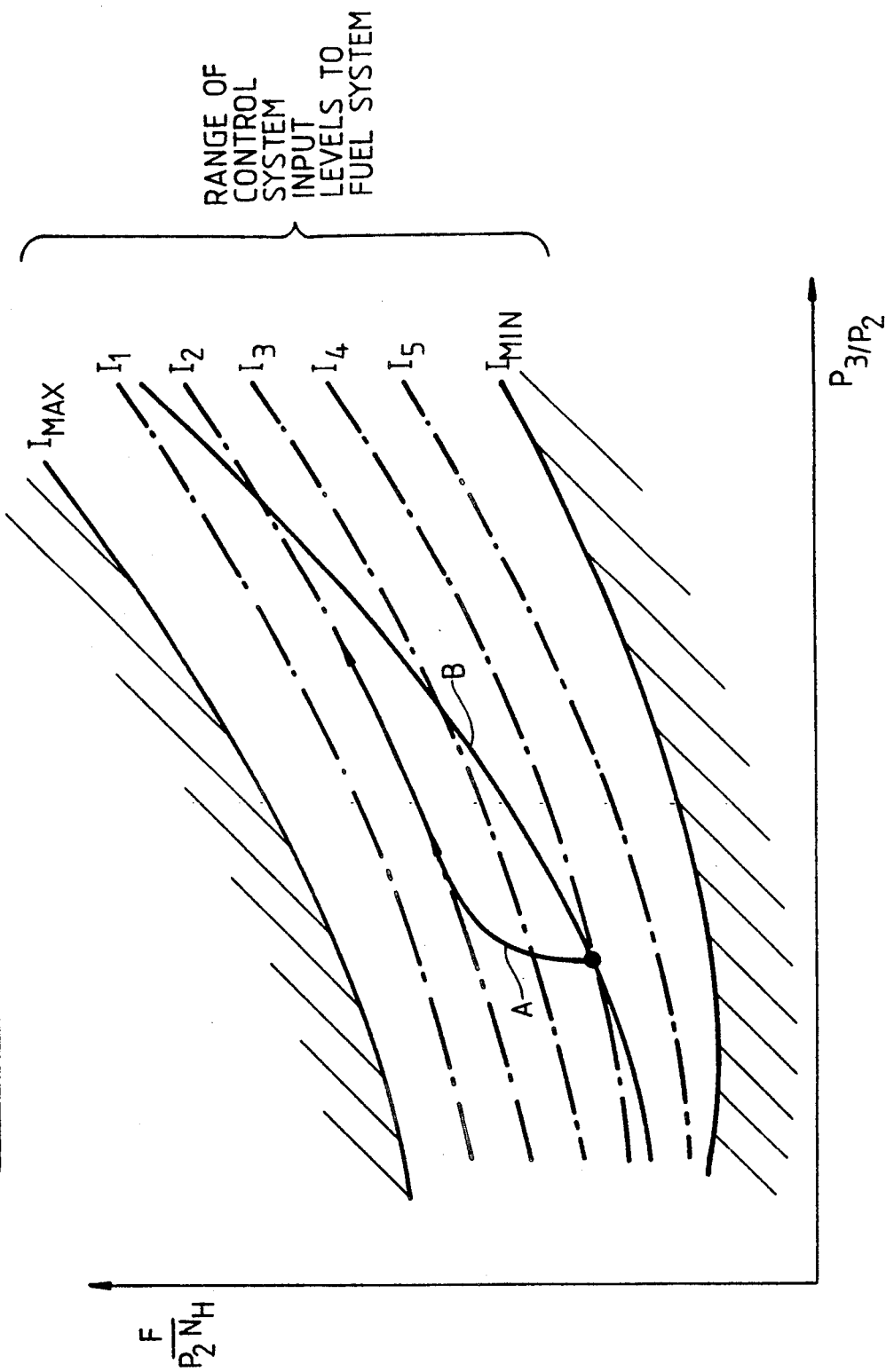
FIG. 1 illustrates typical integrating characteristics of a fuel system.

FIG. 1 illustrates the integrating characteristic of a typical hydromechanical fuel system with electronic control. The engine parameters NH, P2 and P3 determine the basic operation of the fuel system to set a mean level of fuel flow, i.e. steady state engine fuel requirement, while the electronic control system is left to trim the fuel flow and to set a level of overfuelling required by an acceleration demand. In the diagram a measure of the fuel to air ratio requirement is plotted on the y-axis and engine pressure ratio is plotted along the x-axis. The maximum and minimum fuelling boundaries are indicated by the shaded margins Imax and Imin.

Between the fuelling boundaries a range of control system input levels I1-I5 is plotted in broken lines and the engine steady running requirement is plotted as a solid line. Although only a portion of the full engine characteristic is shown the diagram illustrates the requirement that an engine has for increasingly greater quantities of fuel as engine speed or thrust increases.

It also shows by the line "A" that at a given point on its steady running curve "B" an increase in the level of fuelling, say from I4 to I2 will result in the engine speed increasing until the fuelling curve I2 again intersects the steady running curve "B".

The regions above and below the shaded boundaries Imax and Imin respectively are regions of unstable engine operation where an engine is liable to surge. For an extreme acceleration or deceleration the engine running line is made to follow one or the other of these boundaries, as appropriate.

FIG. 2 illustrates the overall engine control system arrangements for measuring essential engine parameters and controlling fuel flow and the variable geometry engine control variables. All the control variables including fuel flow are set, by driving a closed loop torque motor servo arrangement or stepper motor, in response to output demand signals generated by the Digital Engine Control Unit (DECU). The present invention is concerned essentially with the fuel flow control loop. The preferred embodiment of this control loop is illustrated in greater detail in FIG. 7. FIGS. 3-6 are in the same format as FIG. 7, like parts having like references, and illustrate stages in the development of the control principle embodied in the final system.

Figure 3:
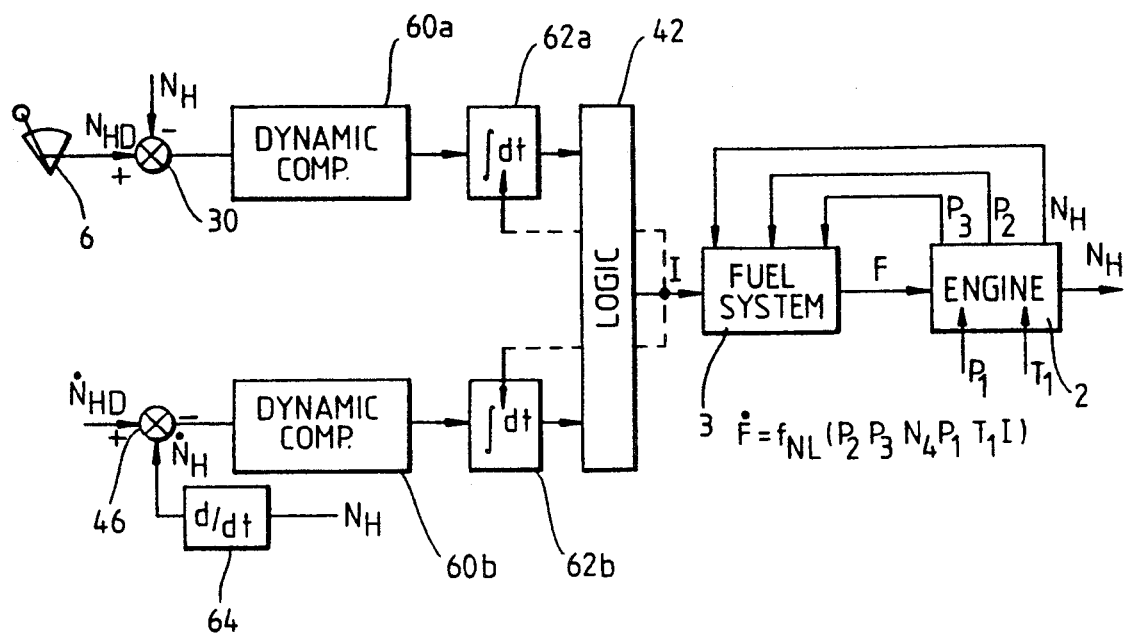
FIG. 3 shows a block diagram of a typical known complex fuel control system of the type employing a hydromechanical fuel flow valve.

The system of FIG. 3 represents a current state of the art fuel system in which fuel flow F to the engine 2 is controlled by a hydromechanical fuel metering system 3. The system 3 is complex in both its construction and in operation in the way it responds to monitored engine parameters P2, P3 and NH which are shown against feedback convections from the engine 2 to the fuel system block 3.

Fuel flow is also dependent upon freestream pressure P1, which is largely determined by altitude and aircraft forward speed which produces a ram effect, and by turbine or jet pipe temperature T1, which is limited by the maximum permitted temperature of certain critical components, e.g. the power turbine blades.

Fuel flow is also dependent upon an electrical signal 1 supplied by an electronic control unit 4. This signal, in effect, merely serves to trim the fuel supply and to generate a level of overfuelling, or underfuelling, in order to accelerate, or decelerate the engine.

The engine fuel requirement increases progressively as engine speed rises so that the fuel system is designed to have an integration effect, at least to a first approximation. Because the integration effect is not perfect each electronic control loop is required to have an electronic integration to ensure accuracy and dynamic compensation to provide stability with rapid response.

The system of FIG. 3 has two possible electronic control loops. The first includes the pilot's engine speed demand lever and signal generator 6, engine speed error circuit 30, dynamic compensation circuit 60a and integrator 62a. The second loop, constituting an acceleration limiter, comprises an acceleration error circuit 46, a dynamic compensation circuit 60b and an integrator 62b. The engine speed signal NH is fedback from the engine to the speed governor loop error circuit 30 directly and to the acceleration limiter loop error circuit 46 via a differentiation circuit 64. Selection of one or the other of these control loops is made on the basis of the lowest fuel requirement wins by logic block 42.

For the sake of brevity a deceleration limiter control loop has been omitted from the drawings of FIGS. 3-6. In practice, a deceleration limiter loop would be very much like the acceleration limiter loop, but of opposite sign and its output would be compared with the output of the NH governor loop on the basis of the highest fuel requirement wins. The result of that comparison being carried forward to the lowest wins logic 42.

Figure 4:
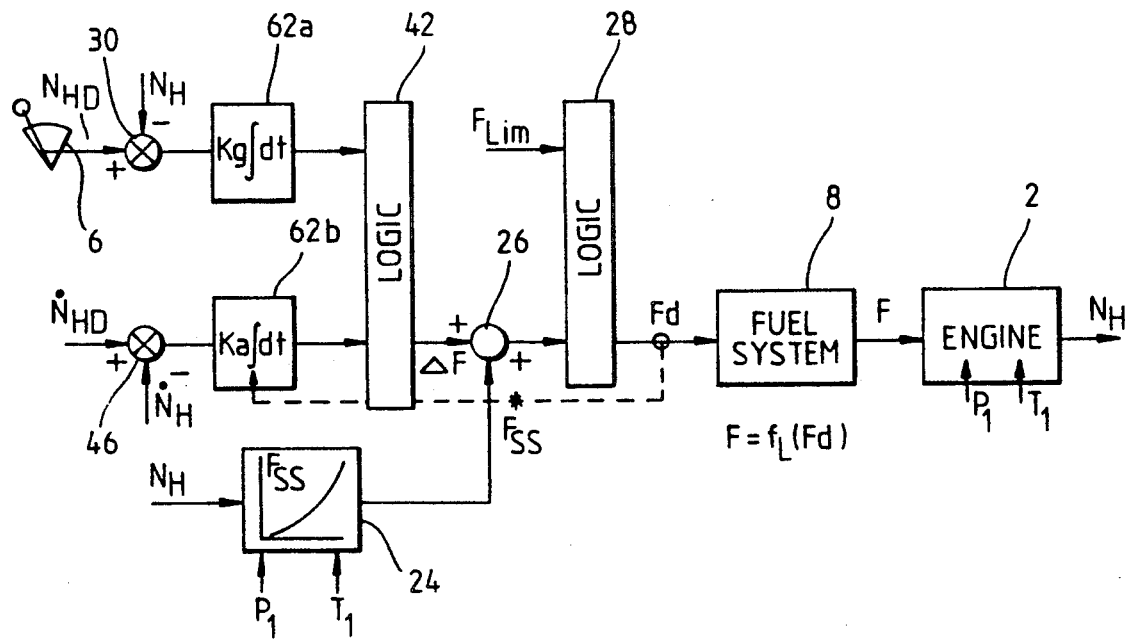
FIG. 4 shows a block diagram of a simple fuel system which uses feedforward of fuel flow estimate.
Figure 5:
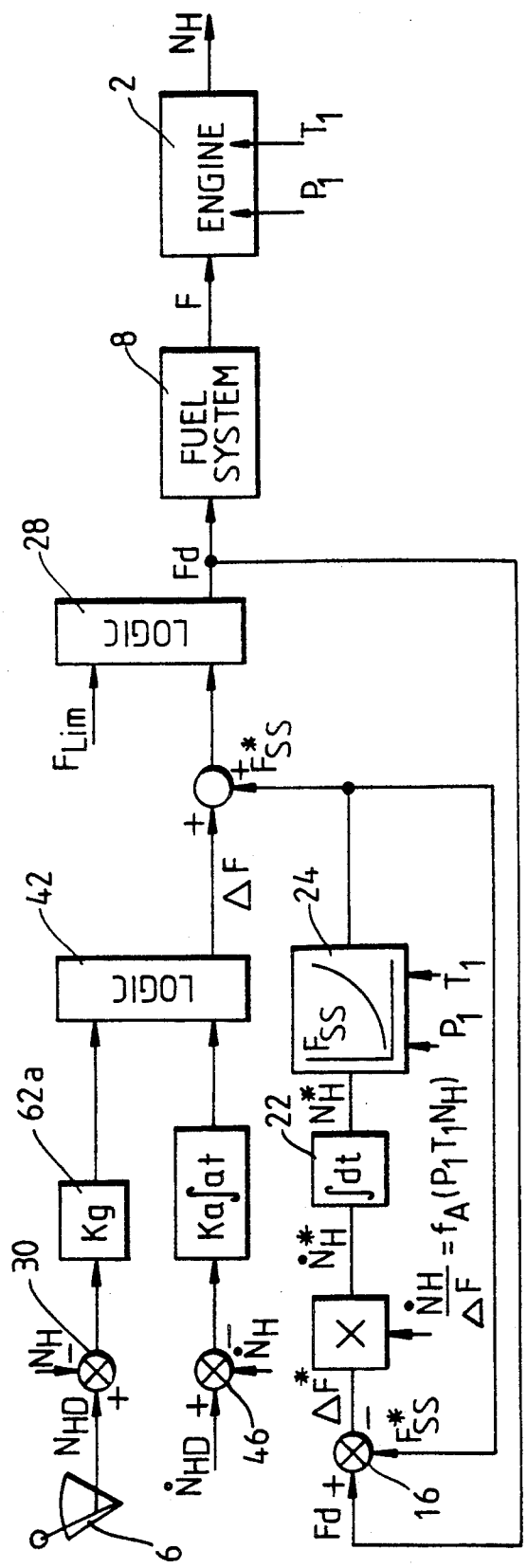
FIG. 5 shows a block diagram of a development of the system of FIG. 4 which uses a mathematical engine model to estimate the engine fuel requirement.

In the system of FIG. 4 the hydromechanical fuel metering means is replaced by a simple fuel metering valve in which fuel flow is solely a function of the valve actuator position or the total fuel demand signal Fd. In order the reproduce the same, or better, quality of performance the complex functions inherent in the operation of the hydromechanical valve have to be replaced by additional computing performance in the electronic control. The dynamic performance of the speed governor and limiter loops are improved because the integrating effect of the fuel system metering valve is no longer present. However, as a result the acceleration and deceleration control loops now have to include two computed integration functions.

The dynamic compensation blocks 60a and 60b are no longer required. In their place an estimated engine steady state fuel requirement Fss* is computed by block 24 in response to an input of NH, and this signal is added to the acceleration overfuelling requirement $\Delta F$ selected by logic 42. Again, for brevity, the corresponding deceleration loop is not shown in the drawing.

The steady state and overfuelling signals Fss and $\Delta F$ are arithmetically summed at summing junction 26 and the total signal is supplied to one input of a further lowest wins logic block 28 for comparison with a maximum fuel signal Flim. The output of this block comprises the final fuel demand signal Fd and is connected to control operation of the fuel system 8. A further minimum fuel limit signal is compared with the output of block 28 by a highest wins circuit but this is omitted from FIGS. 4-6, although it is shown in FIG. 7.

Figure 6:
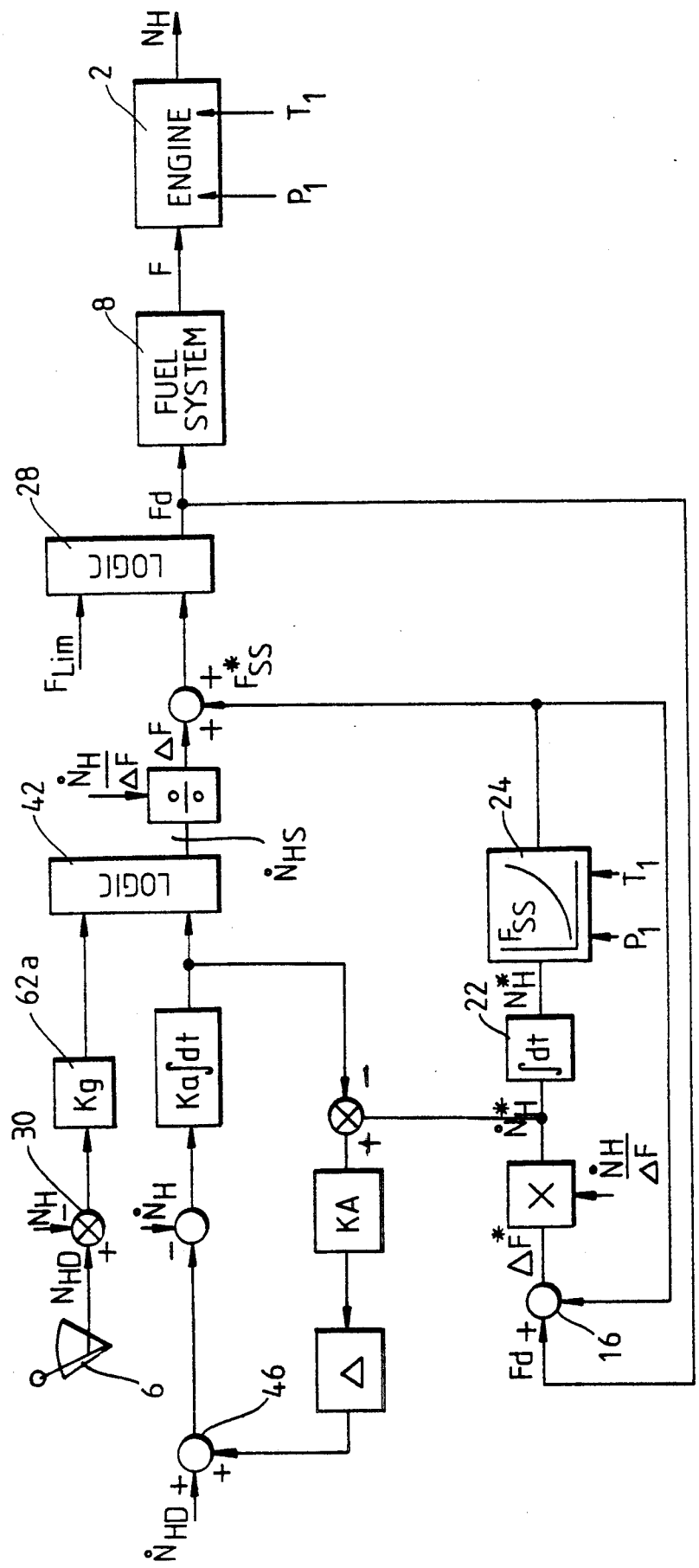
FIG. 6 shows a further development of the system of FIG. 5 including reset of the acceleration control loop.

In FIG. 4 the steady state fuel flow estimate Fss* is an open-loop approximation, in the sense that a measurement of actual engine speed NH is used to compute the estimated steady state fuel requirement Fss*. In contrast the arrangements of FIG. 5 and 6 use essentially the same control loops as in FIG. 4 but the engine is modelled mathematically in order to compute the fuel level Fss*. The system of FIG. 6 is essentially the same as that of FIG. 5 but has an additional signal path for resetting the NHdot loop, this ensures that the output of the integrator in the acceleration control loop does not drift when the loop error signal is zero.

Figure 7:
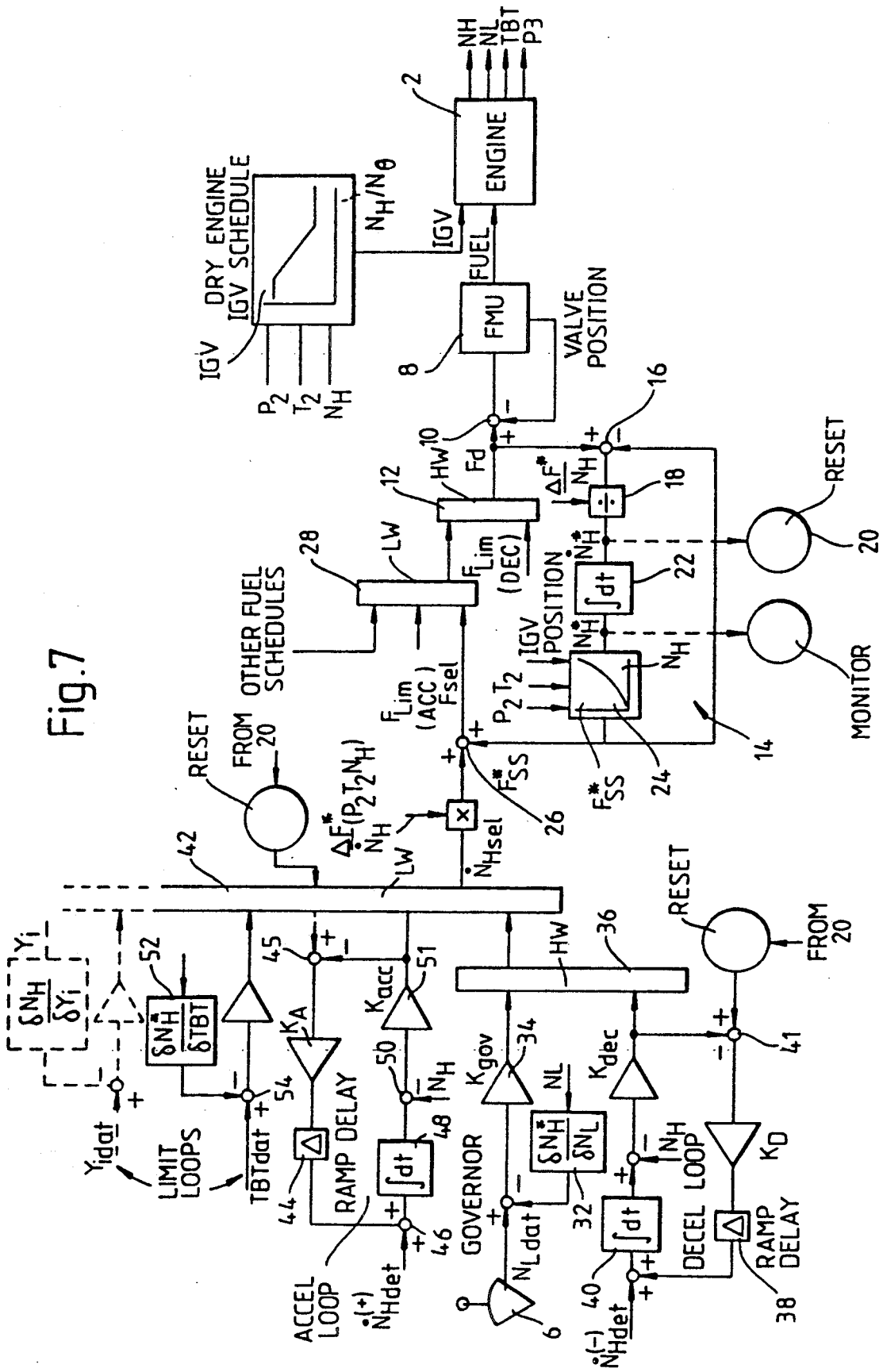
FIG. 7 shows a block diagram of a preferred embodiment of a digital engine control system.

A preferred embodiment of the invention is illustrated more fully in FIG. 7 using the same block diagram format as before. Again like parts have like references. It will be immediately apparent to those skilled in the arts of electronic engineering and the application of computers to control how the system of FIG. 2 may be realised in practice. The data paths, control loops and decision points may be constituted by discrete or integrated circuitry.

However, it is preferred, as in the embodiment being described, to construct the system using a digital processor, the entire control law and all decision processes etc are then embedded in the processor software.

Fuel flow to the engine 2 is controlled by means of the fuel metering valve 8 in which fuel flow is proportional to the position of the valve member and is controlled by an actuator (not shown) driven by the fuel demand signal Fd. In this particular example, the actuator comprises a torque motor which is energised by the error signal output from a summing point 10. The summing junction at 10 receives a negative feedback signal from the valve actuator indicating the position of the valve member and a positive fuel demand signal Fd from block 12. Generally, this fuel demand signal will be provided by an output from the processor.

As described above, under different operating conditions the control system selects a control loop on the basis of the most critical engine parameter. The action of the control system is to compute and set a mean level of fuel flow commensurate with instantaneous engine speed and the engine parameter loop in control at any time sets an additional level of overfuelling, which may be positive or negative, to accelerate or decelerate the engine as required. Loop selection is made generally on the basis of the lowest overfuelling requirement. Since the primary object of this control system is accurate acceleration, in a positive or negative sense, a signal from another control loop affecting fuel flow is given temporary precedence over an acceleration control loop signal, when its signal level demands it, through the intervention of highest and lowest wins logic.

This manner of loop selection in accordance with the overriding requirement will be apparent from the following description.

Basic control of the engine is provided by an estimate of the engine steady state fuel requirement Fss* against high pressure spool speed NH, computed by the engine model loop generally indicated at 14 in FIG. 7.

The input to the engine model loop 14 is the total fuel demand signal Fd and at summing junction 16 the loop output signal i.e. an estimated steady state fuel signal Fss* is subtracted from Fd. The difference is the actual overfuelling demand ΔF, including any limitations imposed by external factors at logic circuits 28 and 12. This difference ΔF is divided at 18 by the rate of change of engine speed with fuel increment ΔF/NHdot to provide an estimate of engine acceleration NHdot*.

The estimated acceleration NHdot* is integrated by integrator 22 to obtain an estimated engine speed NH* from which an estimated steady state fuel requirement Fss* is computed by engine model block 24. Additional signals P2, T2 and, for a variable geometry engine, inlet guide vane angle (IGV) are shown as inputs to block 24. These signals modify the formula used to compute the Fss* v NH* characteristic or, alternatively, to select the most appropriate member of a family of such characteristics in accordance with prevailing conditions represented by the inputs.

The engine is modelled by block 24 and should match as accurately as possible actual engine behaviour. To achieve as close a match as possible, the model may be required to take into account further parameters such as mechanical power, take-off, compressor air bleed level, etc. Thus, further inputs may be provided to block 24.

The structure of the engine model is such that in a steady state, i.e. in a cruise condition, Fss* is equal to Fd with no offset. The relationship between Fd and ΔF, an elemental fuel increment, is in the nature of a zero-offset pure integration and has a phase lead compensation matched closely to the NH v F time constant. The estimated engine acceleration NHdot*, used as an input to integrator 22 is also used as a "reset" input to summing junctions 45 and 41 in the acceleration and deceleration control loops respectively. In the acceleration loop the computed acceleration demand from amplifier 51 is subtracted from the reset input, i.e. the estimated acceleration, to provide a delayed offset at the input to integrator 48 by addition with the positive NHdot datum at summing junction 46. This ensures that the integrator input and output are correctly computed when the loop action is limited or is interrupted by logical switching to another control loop.

The steady state fuel signal Fss* is summed at 26 with a level of overfuelling provided by the selected one of the several loop inputs towards the left and selected by the lowest/highest wins logic. Before this selected fuel level Fsd can be implemented as a fuel demand Fd it is subjected to further logic comparisons at 12 and 28.

Block 28 denotes a lowest wins logic comparison in which Fsd is tested against a maximum fuel limit Flim(ACC) for an engine in acceleration, and also against a variety of other fuel schedules. The lowest winning fuel signal is further tested at 12 against a minimum fuel limit Flim(DEC) by highest wins logic. The lowest wins logic 28 ensures that the engine is not driven into surge by overfuelling, while the highest wins logic 12 ensures that fuel is not cut to a level at which flame-out may occur.

The alternative fuel schedules mentioned above in connection with the inputs to logic 28 include a ground starting fuel schedule in which fuel is incremented in discrete steps from zero according to achievement of predetermined engine speeds as the engine spools are run up from rest; an in-flight starting or relight fuel schedule and a weapons firing (on military aircraft) mode which forcably dips fuel flow to a temporary low maximum to avoid surge or flame-out as a result of ingestion of weapon efflux gas.

The overfuelling requirement for dry engine control is determined by one or another of the control loop inputs towards the left of FIG. 7. The demand from pilot's lever 6 is converted to a spool speed datum signal NHdat in a governor loop input and is summed at summing point 30 with a spool speed monitor signal NH converted into an NH equivalent by block 32. The resulting equivalent NH error signal is scaled in amplifier Kgov, at 34 and is fed into a highest wins logic gate 36 along with a deceleration limiter signal used to control the maximum rate of deceleration.

The deceleration control loop is shown immediately below the governor loop in FIG. 7. When not in control the output of this loop from amplifier Kdec is effectively set to limit NHdot to a fixed proportion of the demand negative NHdot limit, NHdot (−dat).

When this loop takes control the initial limit remains effective for the period of the ramp delay 38. After this delay time the scaled loop error is added to the negative NHdot limit and integrator 40 begins to output a required NH demand. The NH demand is compared with the measured NH engine speed and the error, scaled by amplifier Kdec is supplied to the highest wins logic gate 36 and is fed to second scaling amplifier Kd to update the NHdot limit via the ramp delay 38.

The winning control of the governor and deceleration loops is fed to the first input of a multi-input lowest wins logic gate 42 and compared with a plurality of other potentially limiting inputs.

The first of these further inputs is the positive NHdot limiter, i.e. and acceleration limiter, which is in effect the mirror image of the deceleration limiter described above. The output of this loop from amplifier Kacc is set to limit NHdot to a proportion determined by the gain of Kacc of the demanded positive NHdot datum, NHdot (+dat), when the loop is not controlling. When the engine acceleration signal changes sign and generates a reset and the loop takes control then the previous limit predominates for the period of the ramp delay 44. At the termination of this delay a proportion determined by the gain of KA of the output of Kacc is summed at 46 with the NHdot datum and supplied to the input of integrator 48 to produce an NH demand.

At summing point 50 the error between actual NH and the NH demand is obtained and used, as an input to amplifier Kacc, to update the NHdot limit.

A further limiter based on turbine blade temperature is illustrated immediately above the acceleration loop. The hottest temperature, and therefore the most critical, is to be found in the high pressure turbine section. The temperature in this part of the engine can easily exceed the safe maximum material temperature during engine accelerations unless held in check by limitation of the amount of overfuelling when this becomes critical. A turbine blade temperature measurement signal TBT is supplied to a conversion block 52 which translates the signal to an equivalent NH signal which is compared with a similarly scaled TBT datum signal at summing point 54 to produce a straightforward error signal proportional to the safe remaining temperature margin. This signal is then converted back to an equivalent NHdot figure.

Other limiter functions may be introduced in similar manner. Generally, all loop errors are related to an equivalent NHdot and the loop selection logic is arranged so as to result in the lowest limit, during acceleration, or the highest limit, during deceleration, being selected to determine the engine overfuelling requirement.

The overfuelling requirement level appearing at the output of lowest wins logic gate 42 is expressed in terms of an equivalent NHdot, that is a rate of change of engine speed. This is translated into an actual overfuelling requirement in block 42 by a complex operator which relates NHdot to fuel increment. The said operator is a function of intake air temperature and pressure and engine speed.

In general the overfuelling requirement is a function of pressure and engine speed and of the inverse of temperature and dynamic corrections to the overfuelling factor are made in accordance with changes in the monitored parameters.

The system described could be realised in practice by means of analogue or digital electronic circuits. However, it is preferred as in the described example to employ a microprocessor based control system in which the functions described are set out in appropriate software routine instructions. These instructions form part of a complete engine control program which is executed cyclically under the control of a master clock schedule. In the present example the control program cycle is executed with a period of roughly 50 ms.

In operation each input is sampled, digitised if necessary and operated upon in each cycle in order to arrive at a fresh estimate of the overfuelling and steady state fuel requirements each time. Having calculated the fuel demand output Fd the fuel metering valve is readjusted as necessary to supply the amount of fuel necessary to achieve the desired engine speed.

I claim:

1. An engine fuel control system comprising:
   a fuel flow metering valve arranged to control fuel flow to the engine in response to an aggregate fuel demand signal;
   means for generating the aggregate fuel demand signal which comprises means for summing a steady state fuel requirement signal and an overfuelling demand signal;
   engine model feedback loop means connected to receive the aggregate fuel demand signal and arranged to generate the steady state fuel requirement signal proportional to said aggregate fuel demand signal; and
   means for generating the overfuelling demand signal in accordance with a pilots' thrust or speed demand signal.

2. The fuel control system as claimed in claim 1 wherein the fuel flow metering valve comprises a valve in which fuel flow is proportional to the opening of a valve member in response to the fuel demand signal.

3. The fuel control system as claimed in claim 2 wherein the valve position is controlled by an actuator driven by the fuel demand signal.

4. The fuel control system as claimed in claim 3 wherein the actuator is connected in a feedback control loop in which the actuator is energised by an error signal being the difference between the computed fuel demand signal and a feedback signal representing the opening of the valve member.

5. The fuel control system as claimed in claim 1 wherein the calculated engine speed is an estimate of a high pressure spool speed.

6. The fuel control system as claimed in claim 5 wherein the engine model loop includes a summing point operative to subtract estimated steady state fuel requirement from the fuel demand signal to determine an overfuelling demand signal.

7. The fuel control system as claimed in claim 6 wherein in the engine model loop the overfuelling demand signal is divided by the rate of change of engine speed with fuel increment to provide an engine acceleration signal which is then integrated to provide an estimated engine speed from which the estimated steady state fuel requirement is calculated.

8. The fuel control system as claimed in claim 1 wherein a maximum overfuelling demand signal is generated with regard to an engine acceleration limit signal.

9. The fuel control system as claimed in claim 8 wherein said engine acceleration limit signal is generated in accordance with the rate of change of high pressure spool speed.

10. The fuel control system as claimed in claim 1 wherein engine speed is determined periodically and a fresh fuel demand signal is computed within each period.

* * * * *